United States Patent [19]

Shimizu et al.

[11] Patent Number: 5,001,498

[45] Date of Patent: Mar. 19, 1991

[54] THERMAL TRANSFER PRINTER

[75] Inventors: Isao Shimizu; Takashi Yoshida, both of Ibaraki; Fumio Takeda, Ushiku; Hideki Tanaka, Tsuchiura; Katsumi Watanabe; Yasuhiro Matsuda, both of Ibaraki; Akira Shimizu, Katsuta; Masashi Yoshida, Nakaminato; Toshihiko Gotoh, Tokyo; Koutarou Tanno, Kamakura, all of Japan

[73] Assignee: Hitachi, Ltd., Tokyo, Japan

[21] Appl. No.: 372,832

[22] Filed: Jun. 29, 1989

[30] Foreign Application Priority Data

Jul. 1, 1988 [JP] Japan ................................ 63-162531

[51] Int. Cl.[5] ............................................ G01D 15/10

[52] U.S. Cl. ................................ 346/76 PH; 346/134; 346/136; 400/120

[58] Field of Search .................. 346/76 PH, 134, 136; 400/120

[56] References Cited

U.S. PATENT DOCUMENTS 4,447,832 5/1984 Kurata et al. .................. 346/76 PH 4,532,525 7/1985 Takahashi ...................... 346/76 PH 4,552,470 11/1985 Yana et al. ..................... 346/76 PH

*Primary Examiner*—Mark J. Reinhart

*Assistant Examiner*—Huan Tran

*Attorney, Agent, or Firm*—Antonelli, Terry, Stout & Kraus

[57] ABSTRACT

A thermal transfer printer including a thermal head for generating heat in accordance with a desired print pattern, a platen having a surface for supporting an ink-sheet and paper, the ink-sheet and paper being pressed by the thermal head on the platen surface so that ink from the ink-sheet is transferred to the paper, a paper supply for storing and supplying paper, an ink-sheet supply and drive for storing and supplying an ink-sheet, the ink-sheet supply and drive driving the ink-sheet to move in accordance with the movement of the paper, a paper drive arranged between the platen and the paper supply, the paper drive driving the paper by the required length according to the position of the paper relative to the position of the platen, and a paper tension device for applying suitable tension to the paper at least between the platen and the paper drive so that the length by which the paper drive drives the paper is identical with the length by which the paper moves on the platen. Since the length by which the paper moves on the platen corresponds only to the length by which the paper drive drives the paper, the length by which the paper moves on the platen can be correctly controlled through the paper drive.

14 Claims, 15 Drawing Sheets

THERMAL TRANSFER PRINTER

BACKGROUND OF THE INVENTION

The present invention relates to a thermal transfer printer.

The conventional thermal transfer color printer has a thermal head, a platen roller and a drive mechanism which includes paper driving rollers and ink-sheet driving rollers. The paper driving rollers drive paper to be placed between the thermal head and the platen roller together with the ink-sheet driven by the ink-sheet driving rollers. The thermal head stamps the paper and the ink-sheet on the platen roller, and the thermal head is heated to effect printing. The stamped part of the paper is reciprocated many times by the paper driving rollers to effect multilayer printing. The conventional thermal transfer color printer of this type is disclosed in Japanese Unexamined Patent Publication No. 60-38181 and Japanese Unexamined Patent Publication No. 62-119070.

In the conventional thermal transfer printer, since the paper slips on the paper driving rollers and/or since the driven paper is slack for a time, the transferred colors for printing can not be fixed in the identical and correct position on the paper.

SUMMARY OF THE INVENTION

The object of the present invention is to provide a thermal transfer printer in which transferred color for printing can be fixed in the identical correct position on a paper.

The heat-type printing recording device according to the present invention has a thermal head, platen means, paper supplying means, ink-sheet supplying and driving means, paper driving means and paper tension means, the paper driving means being arranged between the platen means and the paper supplying means, the paper driving means driving the paper the required length according to the printing position of the paper, the paper tension means applying suitable tension to the paper at least between the platen means and the paper driving means so that the length by which the paper driving means drives the paper is identical with the length by which the paper moves on the thermal head.

Since the length by which the paper moves on the thermal head corresponds only to the length by which the paper driving means, arranged between the platen means and the paper supplying means, drives the paper, the length by which the paper moves on the thermal head can be correctly controlled through the paper driving means.

Other objects and features of the present invention will be described below.

DETAILED DESCRIPTION OF PREFERRED EMBODIMENTS

FIGS. 1 to 9 show an embodiment of the present invention.

Figure 1:
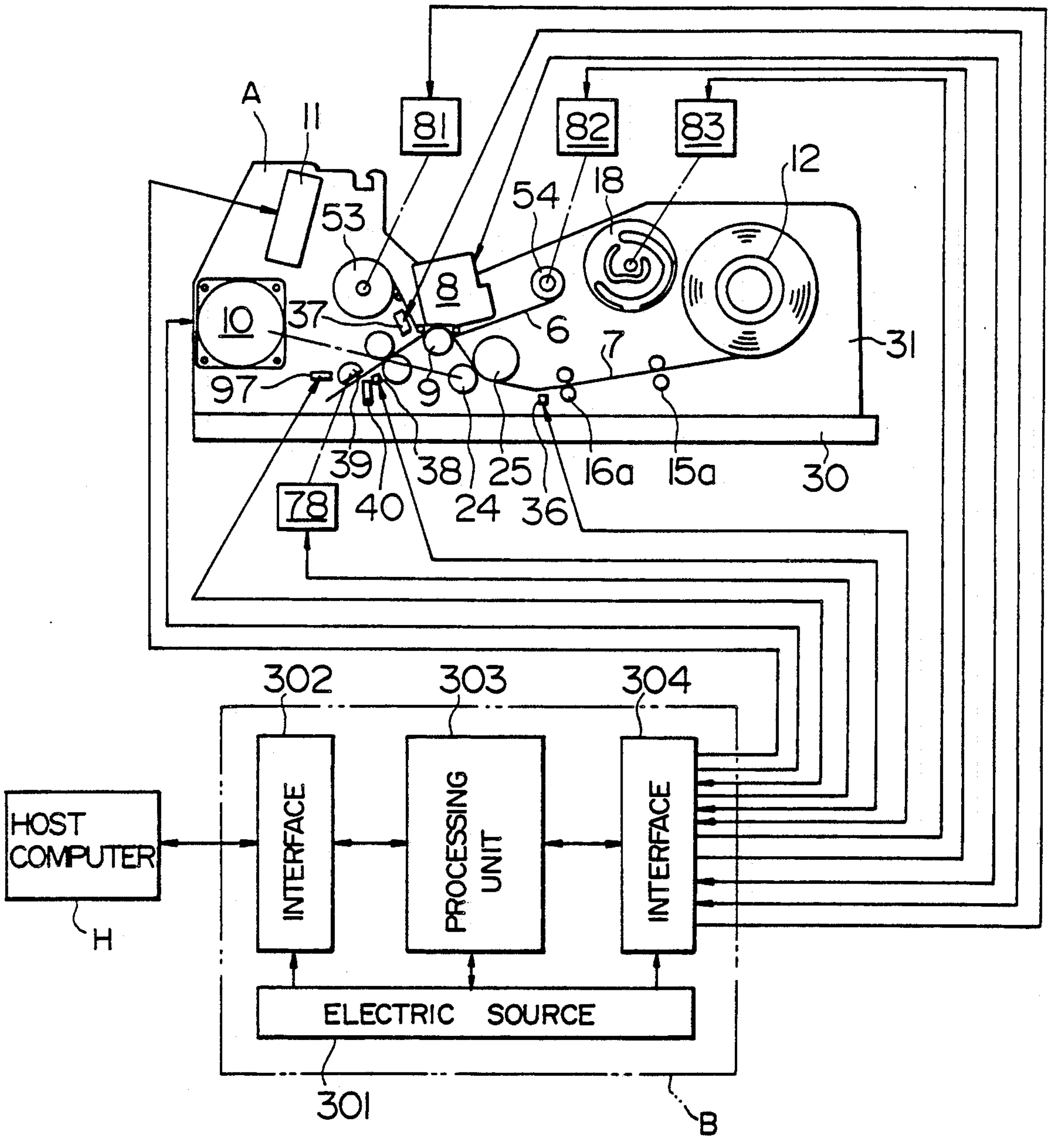
FIG. 1 is a schematic diagram showing an embodiment of the present invention.

A control device B and motors 78, 81, 82 and 83 are depicted outside of a body A in FIG. 1, but in a practical printing device the control device B and motors 78, 81, 82 and 83 are arranged in the body A. The control device B has interfaces 302 and 304, a processing unit 303 and an electric source 301. The processing unit 303 accesses data indicative of a pattern, a letter, a graph and so forth from a host computer H through the interface 302. The processing unit 303 is a electric circuit having a micro-computer, memories and so forth. The processing unit 303 transmits the printing data through the interface 304 and controls the operation of the body A. The control device B controls a thermal head 8 to generate heat according to the printing data, accesses signals from sensors 36, 37, 38 and 97 and controls the operation of the motors 10, 11, 78, 81, 82 and 83. These motors are controlled in accordance with a sequence program stored in the control device B and drive a paper driving roller 24, an ink-sheet supplying roller 53 and an ink-sheet take-up reel 54 so that the paper 7 and an ink-sheet 6 are driven. The thermal head 8 is synchronized with the travel of paper 7 and ink-sheet 6 and generates heat for printing to transfer ink from the ink-sheet 6 to the paper 7, so that the required print is fixed on the paper.

Figure 2:
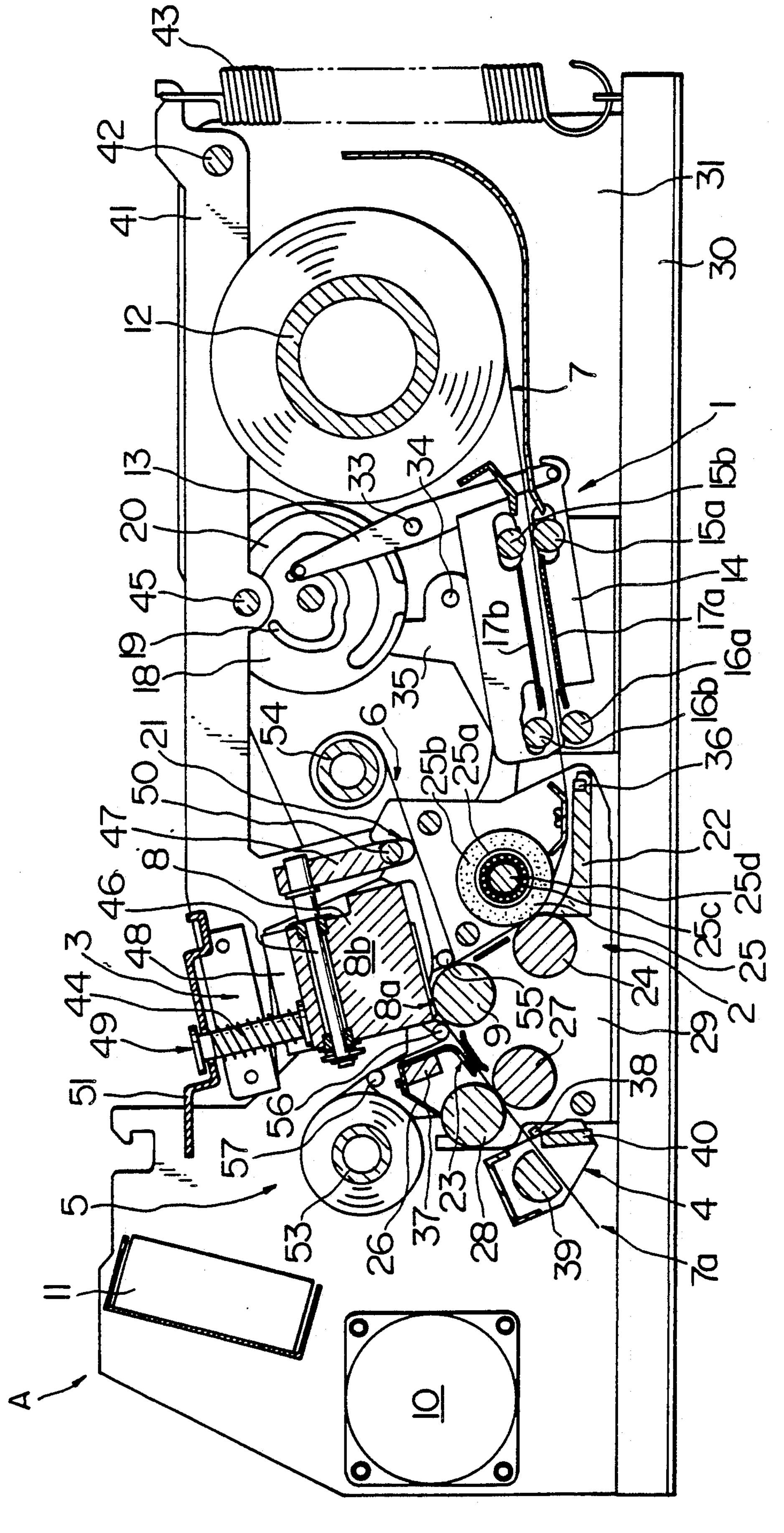
FIGS. 2 and 3 are partially cross-sectional views showing mechanical portions of the embodiment shown in FIG. 1.
Figure 3:
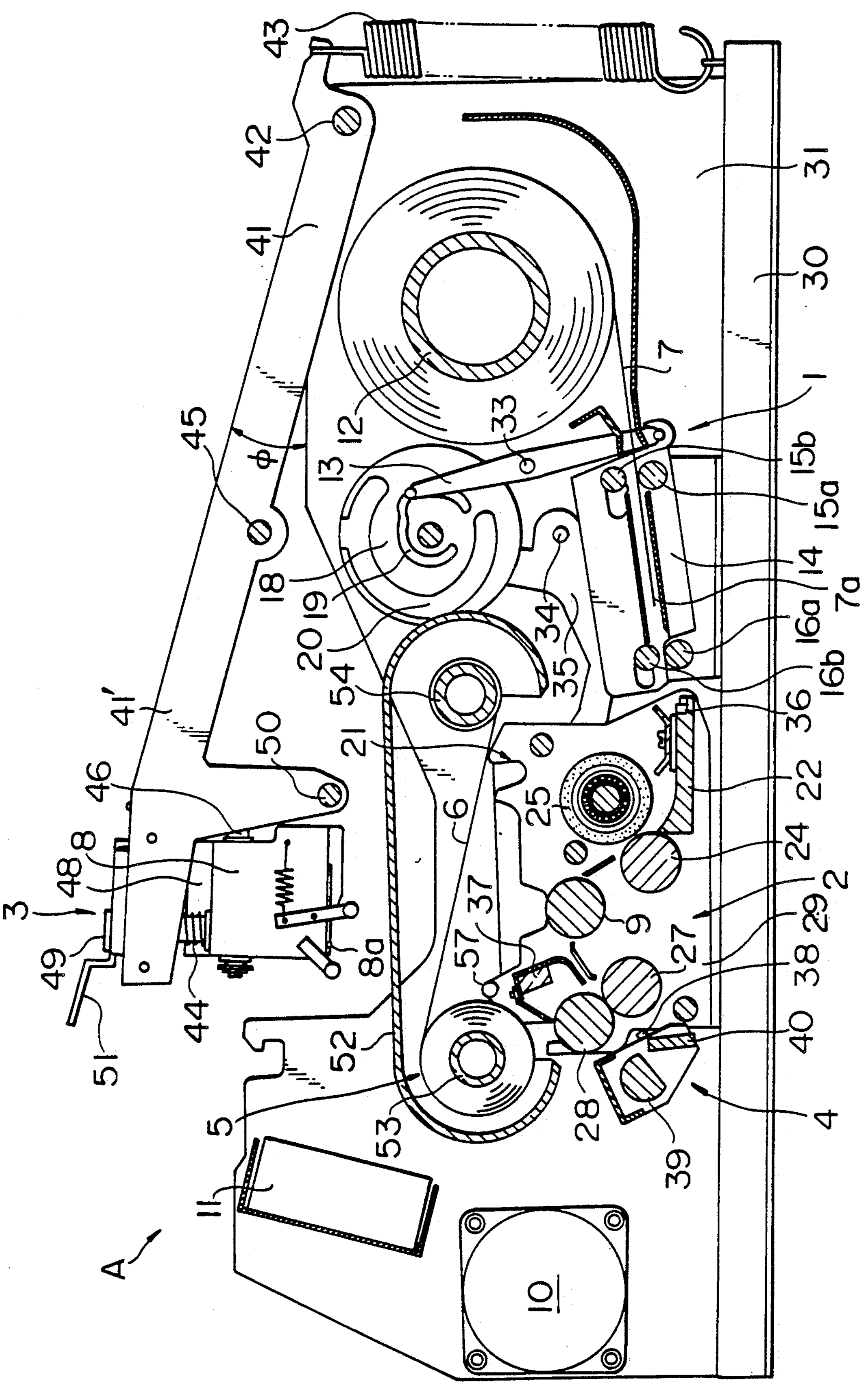

As shown in FIGS. 2 and 3, the printing device has two side plates 31 and 31' which are fixed vertically on a bottom plate 30, and a paper supplying unit 1 and a paper driving unit 2 which are fixed on the bottom plate 30 by bolts. A head unit 3, a cutter unit 4, the main motor 10 and a cooling fan 11 are attached to the side plates 31 and 31'. An ink unit 5 forms a cassette and is received among ink unit receivers 79, 79', 80 and 80' (FIG. 9) attached to the side plates 31 and 31'. A paper supplying roller 12 for supplying the paper 7 is received in paper supplying roller receivers 32 and 32' (FIG. 8) attached to the side plates 31 and 31' in a manner similar to the manner of the ink unit 5. The printing surface of the paper 7 is arranged inwardly in comparison with the other surface thereof on the paper supplying roller 12.

The paper 7 supplied by the paper supplying roller 12 is fed through paper supplying unit 1, paper driving unit 2 and the cutter unit 4. The paper supplying unit 1 has a pair of front paper supplying rollers 15*a* and 15*b*, a pair of rear paper supplying rollers 16*a* and 16*b*, and paper guides 17*a* and 17*b*. The front paper supplying roller 15*a* and the back paper supplying roller 16*a* are moved vertically in accordance with the left or right movement of a paper supplying frame 14. The paper supplying frame 14 is moved right or left by a paper supplying lever 13 which is driven in a groove 19 arranged on a cam 18 so that the paper supplying lever 13 is rotated on an axis of a pin 33.

The paper driving block 2 has paper guides 22 and 23, a paper driving roller pair consisting of a paper driving roller 24 and a pressing roller 25, a platen roller 9, a paper tension roller pair consisting of a paper tension roller 27 and a paper tension pressing roller 28. The rollers and the guides are fixed on roller chassis 29 and 29' rotatably or by bolts respectively. The paper driving roller 24 is a rigid cylinder made of, for example, stainless steel. Ceramic grains are adhered to a circumferential surface of the paper driving roller 24 so that the coefficient of friction between the circumferential surface of the paper driving roller 24 and the paper 7 is increased. The pressing roller 25 has a rigid tube 25*a* and an elastic body 25*b* which is made of, for example, rubber and which surrounds the circumferential surface of the rigid tube 25*a*. The pressing roller 25 is supported on a shaft 25*d* through a rotational bearing 25*c* arranged in a hollow of the tube 25*a*. The shaft 25*d* is attached rotatably on the roller chassis 29 and 29'. Pressing levers 35 are attached to the ends of the shaft 25*d*. The pressing levers 35 are driven in a groove 21 (not shown in figure) arranged on the cam 18 so that the pressing levers 35 are rotated on an axis of a pin 34. The pressing levers 35 press the pressing roller 25 against the paper driving roller 24 or release the pressing roller from the paper driving roller 24. The platen roller 9 and the paper tension roller 27 are cylindrical rollers each of which has a central stainless steel member and an elastic surface member made of, for example, rubber. The paper tension pressing roller 28 is made of plastic, for example, juracon. A plate spring 26 attached to the paper guide 23 presses the paper tension pressing roller 28 against the paper tension roller 27. A sensor 36 for detecting the paper 7 is attached to the paper guide 22. A sensor 37 for detecting the ink-sheet 6 is attached to the paper guide 23.

The cutter unit 4 has a rotational cutter 39, a fixed cutter 40 and a sensor 38 for detecting the paper 7. The cutter unit 4 is fixed on the side plates 31 and 31'. The paper 7 fed between the rotational cutter 39 and the fixed cutter 40 is cut by the rotational cutter 39. The rotational position of the rotational cutter 39 is detected by the sensor 97 (shown in FIG. 9) so that the rotational cutter 39 is stopped at a constant position.

It is advisable that the sensor 36, the ink sensor 37, the sensor 38 and the sensor 97 be noncontacting type detectors, such as light reflection type detectors or sonic type detectors. But, contacting type detectors, such as limit switches, may be used.

The head unit 3 has a thermal head 8 at the left end of a head arm 41 and a shaft 42 at the right end thereof. The head unit 3 is pivoted on the axis of the shaft 42 and moved upward. The shaft 42 is attached to the side plates 31 and 31'. A coil spring 43 is arranged at the right end of the head arm 41 so that the raised head unit 3 is held at the raised position thereof. The rotational moment of the force of the coil spring 43 balances the rotational moment of gravity on the head unit 3 on the axis of shaft 42. The head unit 3 can be raised, as shown in FIG. 3, continuing to a position where the head arm is arranged vertically ($\phi$=about 90 degrees).

Figure 4:
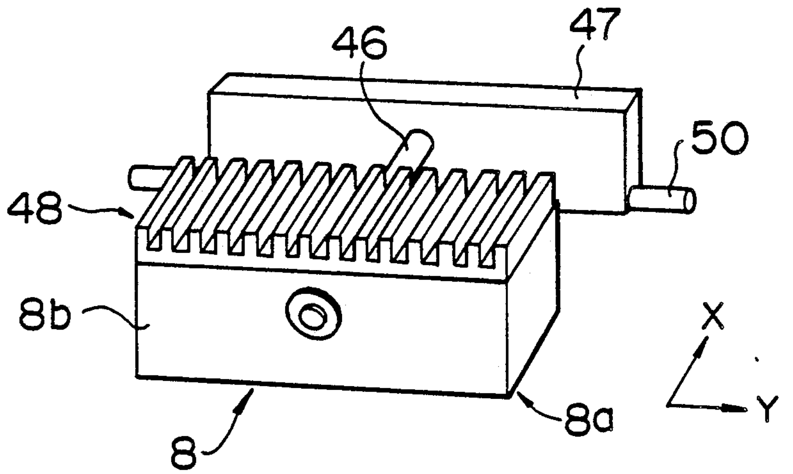
FIG. 4 is a perspective view showing a supporting mechanism for a thermal head.
Figure 5:
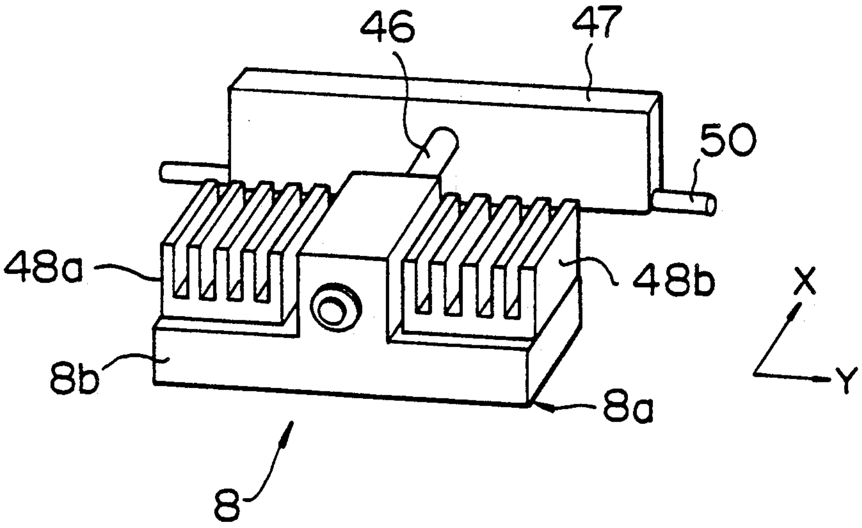
FIG. 5 is a perspective view showing supporting mechanism having a smaller size in comparison with the supporting mechanism shown in FIG. 4.

The thermal head 8 has a heating resistance element 8*a* and a head block 8*b*, a longitudinal central position of which is rotatably supported by a shaft 46. As shown in FIG. 4, the shaft 46 is attached squarely to a head attaching plate 47 which is arranged parallel to the longitudinal direction of the thermal head 8 (Y direction) and which is fixed on a head positioning shaft 50. The head positioning shaft 50 is rotatably attached to the head arms 41 and 41'. A cooling fin 48 is arranged on the head block 8*b* and moves with the thermal head 8. Therefore, the thermal head is rotatable about the axis of the shaft 46 and about the axis of the head positioning shaft 50. FIG. 5 shows another embodiment of the thermal head 8' having a smaller size in comparison with the thermal head shown in FIG. 4. The thermal head 8' shown in FIG. 5 has concavities at both ends thereof in which the cooling fins 48*a* and 48*b* are received. The means for supporting the thermal head 8 shown in FIG. 5 is similar to the means for supporting the thermal head 8 shown in FIG. 4. Cooling air from the cooling fan 11 passes over the cooling fins 48 so that the thermal head is cooled.

A rotatable front separating roller 55 and a rotatable back separating roller 56 are arranged under the thermal head 8. The thermal head 8 is pressed against the platen roller 9 by a coil spring 44. The spring 44 is mounted between an upper surface of the head block 8*b* and a lower surface of a head top plate 51 and is guided by a shaft 49 inserted through the spring 44. The head unit 3 is arranged at an end of the head arm 41, at the opposite end of which the head arm is pivotably supported by a pin 42. The head arm 41 has a pin 45 at a middle portion thereof. The pin 45 is guided in a groove 20 of the cam 18 and is moved in accordance with the rotation of the cam 18 so that the head arm 41 swings. The movement of the pin 45 drives the head arm 41 and the head top plate 51 vertically so that the force of the spring 44 presses the thermal head 8 against the platen roller 9.

The printing between the ink-sheet 6 and the paper 7 is effected at the circumferential surface of the platen roller 9 by the thermal head 8. For high-quality printing, it is necessary to arrange the heating resistance element 8*a* of the thermal head 8 in the center of the contacting width (nip width) between the thermal head and the platen roller. Therefore, the head positioning shaft 50, attached to the head arm 41, is guided closely by a U-shaped groove 21 and 21' arranged at upper ends of the roller chassis 29 and 29'.

Figure 6:
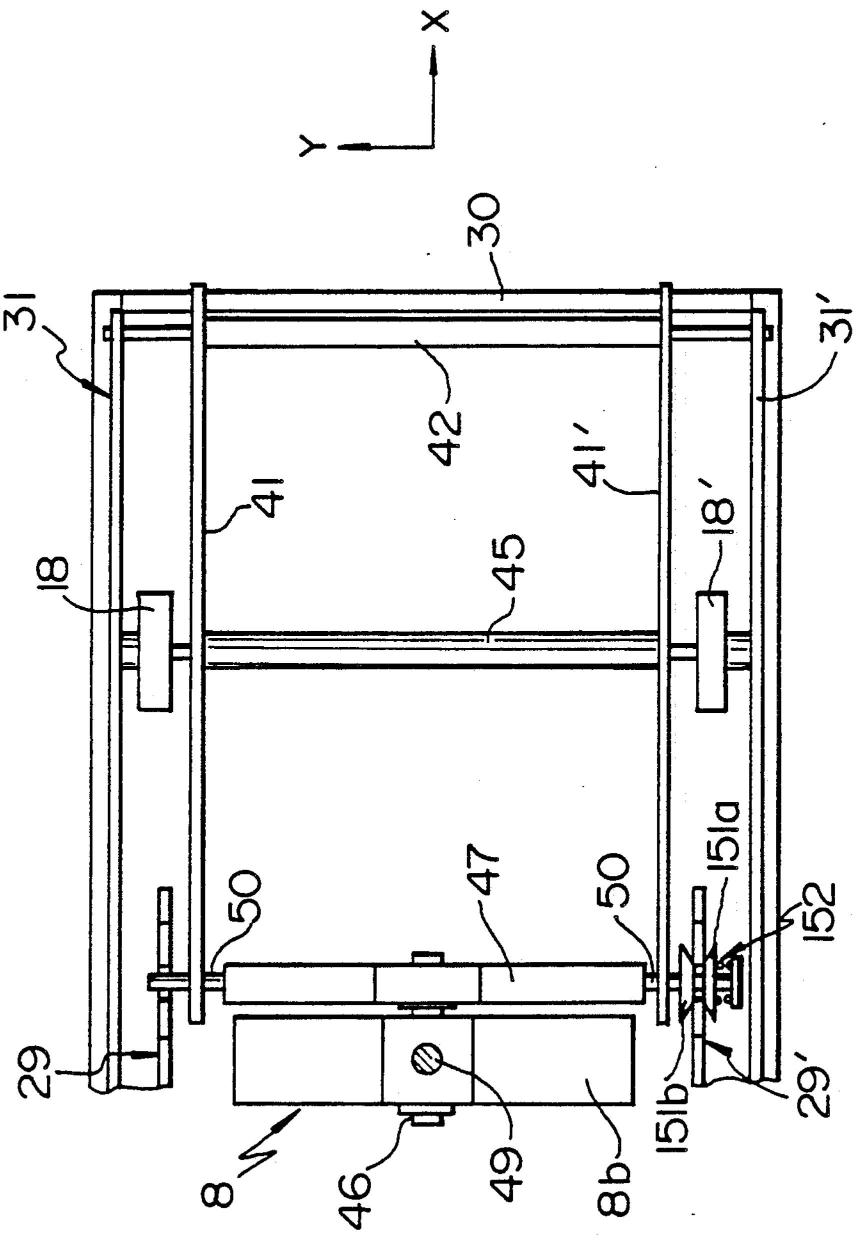
FIG. 6 is a plan view showing a head block usable in the embodiment shown in FIG. 2.

In FIG. 6, the above structure is shown in detail. A positioning plate 151*b* is fixed to an end of the head positioning shaft 50, a positioning plate 151*a* can be slid on the head positioning shaft 50 by a spring 152, and the roller chassis 29' is arranged between the positioning plates 151*a* and 151*b* so that the head positioning shaft 50 is positioned in relation to the roller chassis 29' in Y direction. The head positioning shaft 50 is also inserted in the U-shaped grooves 21 and 21' so that the head positioning shaft 50 is positioned in X direction. As a result, the heating resistance element 8*a* of the thermal head 8, attached to the head positioning shaft 50 through the head attaching plate 47 and the shaft 46, is correctly positioned in the X and Y directions on the platen roller 9 attached to the roller chassis 29 and 29'.

Figure 7:
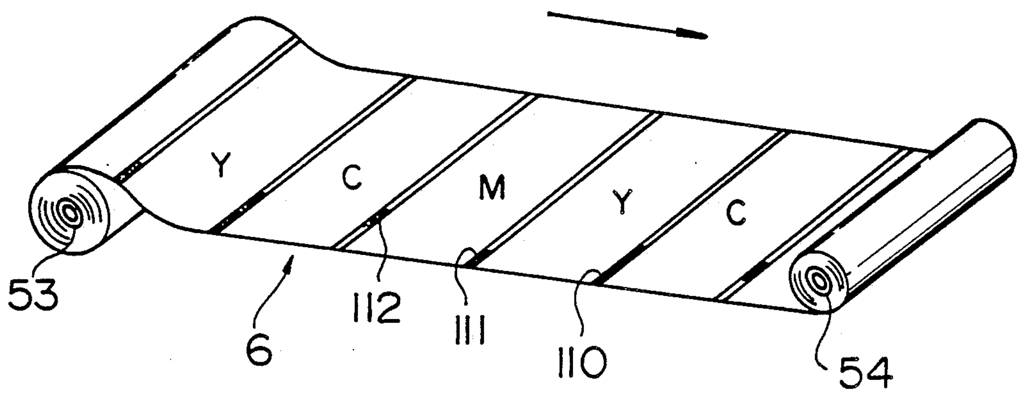
FIG. 7 is a perspective view showing an inksheet.

As shown in FIG. 3, the ink unit 5 has the ink-sheet supplying roller 53 which is within an ink case 52, the ink-sheet reel or winding roller 54 which is also within ink case 52, and the ink-sheet 6 which moves from the ink-sheet supplying roller 53 to the ink-sheet winding roller 54. Between the ink-sheet supplying roller 53 and the ink-sheet winding roller 54 the ink-sheet 6 is pressed by the thermal head 8 against the platen roller 9 as shown in FIG. 2. (In FIG. 2, the ink case 52 is omitted.) The ink-sheet 6 passes over a rotatable guide shaft 57 attached to the roller chassis 29 and 29', the back separating roller 56, the platen roller 9, and the front separating roller 55. As seen in FIG. 7, the ink-sheet 6 has color ink units each of which has a Y (yellow) ink surface, a M (magenta) ink surface and a C (cyanogen) ink surface, which ink surfaces are divided by ink-mark lines 110, 111 and 112 detected by an ink sensor 37, shown in FIG. 2, and which are arranged in order.

The driving structure of the body A will be described below.

Figure 8:
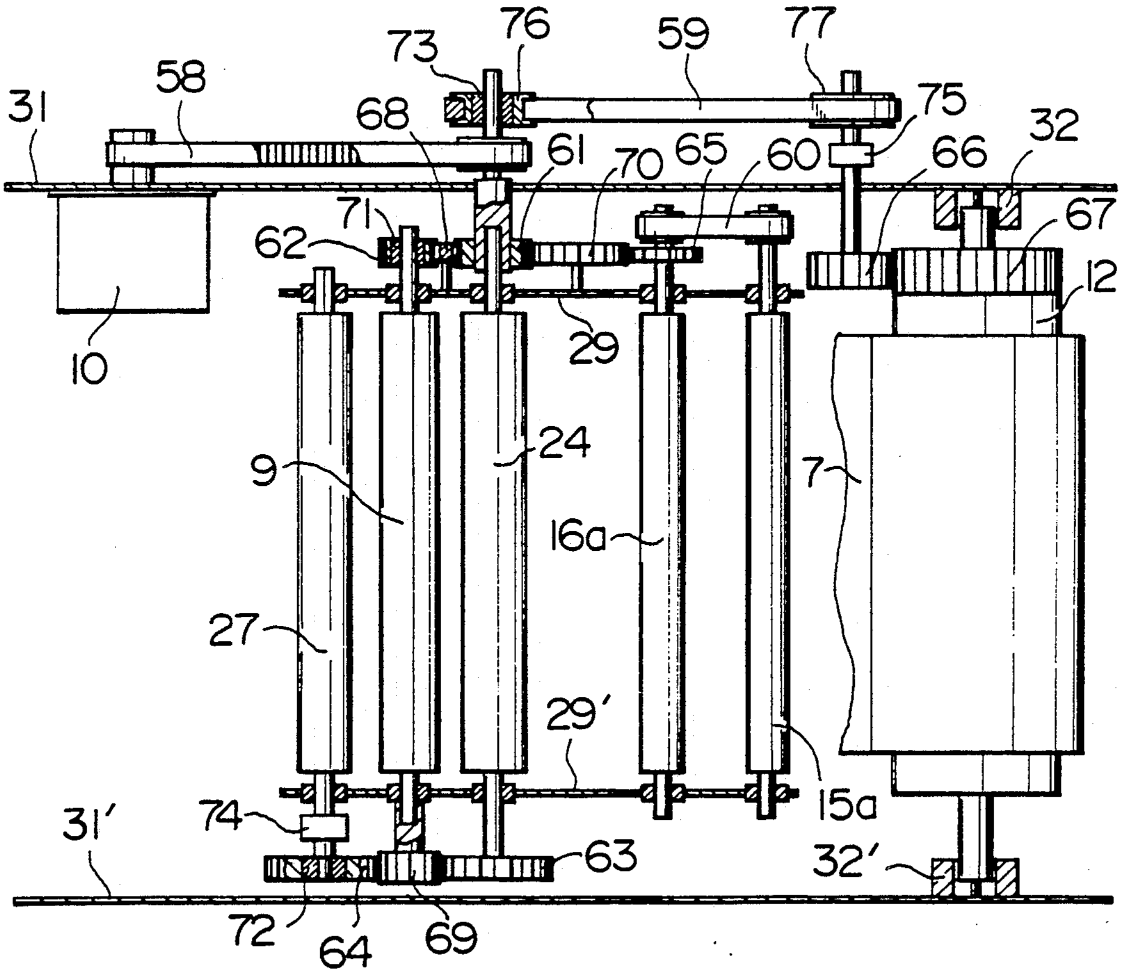
FIGS. 8 and 9 are plan views showing a driving mechanism usable in the embodiment shown in FIG. 2.

In FIG. 8, the output of the main motor 10, attached to the side plate 31, is delivered to the paper driving roller 24, the platen roller 9, the paper tension roller 27, the front paper supplying roller **15*a*, the back paper supplying roller 16*a*, and the paper supplying roller 12 through power transmission means. The main motor is, for example, a pulse motor. The main motor 10 drives the paper driving roller 24 through a belt 58. A gear 61 fixed to the paper driving roller 24 engages an idler gear 68 which engages a gear 62 that is mounted on the platen roller 9 through an oneway clutch 71. The gear ratio between the gears 61 and 62 is determined suitably in accordance with the diameters of the platen roller 9 and the paper driving roller 24 so that the peripheral speed of the platen roller 9 is slightly more than that of the paper driving roller 24 when the platen roller 9 is driven by the main motor to cause tension to be applied to the paper 7 between the paper driving roller 24 and the platen roller 9. The one-way clutch 71 delivers torque from the main motor 10 to the platen roller 9 to move the paper 7 from the paper driving roller 24 toward the platen roller 9 when the paper driving roller 24 is rotated by the main motor 10 in the direction moving the paper 7 from the paper driving roller 24 toward the platen roller 9. The platen roller 9 is not driven by the main motor 10 when the main motor 10 rotates in the direction moving the paper 7 from the platen roller toward the paper driving roller 24. Since the one-way clutch 71 delivers only one-way torque, the platen roller 9 can be rotated in the direction for drawing the paper 7 from the platen roller 9 toward the paper tension roller 27 when the paper driving roller 24 stops, so that any paper 7 in trouble can be removed. Another gear 63, fixed to the paper driving roller 24, engages with an idler gear 69 which engages with a gear 72 connected to the paper tension roller 27 through an one-way clutch 72 and a clutch-brake unit 74. Since the gear ratio between the gears 63 and 72 is determined suitably in accordance with the diameters of the paper tension roller 27 and the paper driving roller 24, the peripheral speed of the paper tension roller 27 is more than that of the paper driving roller 24 when the paper tension roller 27 is driven, without slip of clutch-brake unit 74, by the main motor so that tension is applied to the paper 7 between the paper driving roller 24 and the paper tension roller 27. However, when the paper tension roller 27 applies tension to the paper 7, the paper tension roller 27 is driven through the slip of the clutch-brake means 74 so that the peripheral speed of the paper tension roller 27 is identical with that of the paper driving roller 24. The one-way clutch 72 delivers torque from the main motor 10 to the paper tension roller 27 to move the paper from the paper driving roller 24 toward the paper tension roller 27 when the paper driving roller 24 is rotated by the main motor 10 in the direction moving the paper from the paper driving roller 24 toward the paper tension roller 27. Since the one-way clutch 72 delivers only one-way torque, the paper tension roller 27 can be rotated in the direction drawing out the paper 7 from the paper tension roller 27 when the paper driving roller 24 stops, so that any paper 7 in trouble can be removed. The clutch-brake unit 74 delivers torque from the main motor 10 to the paper tension roller 27 when the paper is stopped or is moved toward the paper tension roller 27 from the platen roller 9 in accordance with the rotation of the paper driving roller 24, and the delivered torque is controlled by the control device B according to the required tension of the paper. The clutch-brake unit 74 brakes the rotation of the paper tension roller 27 when the paper is moved toward the paper driving roller 24 from the platen roller 9 in accordance with the rotation of the paper driving roller 24, and the braking force for the rotation of the paper tension roller 27 is controlled according to the required tension of the paper. The gear 61, driven by the main motor 10, engages with an idler gear 70 which engages with a gear 65 attached to the back paper supplying roller 16*a*. The back paper supplying roller 16*a*, driven by the main motor 10, drives the front paper supplying roller 15*a* through a belt 60. The paper driving roller 24 drives the paper supplying roller 12 through an one-way clutch 73, a pulley 76, a belt 59, a pulley 77, a torque limiting transmission 75, a gear 66, and a gear 67. The torque limiting transmission 75 delivers a limited torque under the predetermined degree to the paper supplying roller 12 to wind the paper 7 thereon. The one-way clutch 73 delivers torque from the main motor 10 to the paper supplying roller 12 when the paper driving roller 24 is rotated to move the paper 7 toward the paper driving roller 24 from the platen roller 9**.

Preferably, the paper driving roller 24 and the paper tension roller 27 have ceramic-grain-coated circumferential surfaces so that the paper driving force is increased. Preferably, also, the paper driving pressing roller 25 and the paper tension pressing roller 28 have elastic circumferential surfaces made of, for example, rubber so that the paper 7 is constantly pressed on the paper driving roller 24 and the paper tension roller 27. Since the frictional forces of the paper tension roller 27 and the paper driving roller 24, having ceramic-grain-coated surfaces, are increased and since the paper 7 on the platen roller 9 is held by the paper tension roller 27 and the paper driving roller 24, the paper 7 can not move in the longitudinal direction of the rollers. Therefore, even when the printer prints on only a half of the paper width, the paper 7 is correctly guided so that the printing position is correctly controlled.

Figure 9:
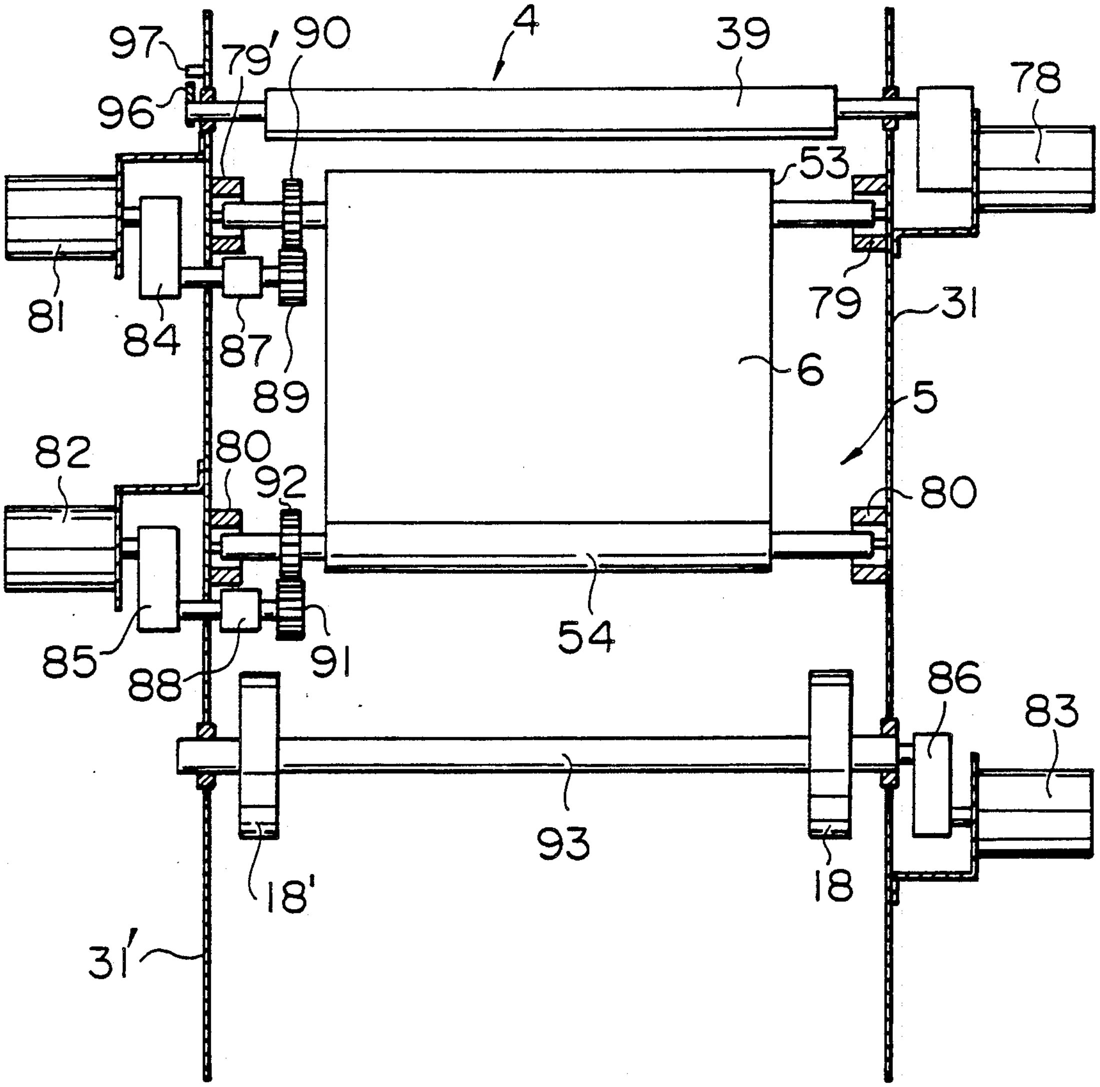

FIG. 9 shows the driving structure for the cutter unit 4, the ink unit 5 and the cam 18.

The rotational cutter 39 of the cutter unit 4 is driven by a reduction gear motor 78. An end of the rotational cutter 39 has a detective plate 96 which faces a sensor 97 attached to the side plate 31'. The ink case 52 of the ink unit 4 is omitted in FIG. 9. The ink-sheet supplying roller 53 is mounted on the ink receivers 79 and 79' of the side plates 31 and 31'. A gear 90 fixed to the ink-sheet supplying roller 53 engages with a gear 89 which is connected to an ink-sheet supplying motor 81 through a torque limiting transmission 87 and a speed-reduction gear 84. The torque limiting transmission 87 delivers a limited torque under a predetermined level to the ink-sheet supplying roller 53. The driving structure of the ink-sheet winding roller 54 is similar to that of the ink-sheet supplying roller 53. The torque limiting transmission 88 delivers a limited torque under a predetermined level to the ink-sheet winding roller 54 from an inksheet winding motor 82 through gears 91 and 92.

The cam 18 and 18', attached to both ends of a cam shaft 93, are driven by a mode motor 83 through a speed-reduction gear 86. The mode motor 83, the ink-sheet supply motor 81 and the ink-sheet winding motor 82 are, for example, DC motors.

The operation of the embodiment is described below. For this explanation, the direction from the platen roller 9 toward the paper driving roller 24 is called "upstream," and the direction from the platen roller 9 toward the paper tension roller 27 is called "downstream."

The travel of the paper 7 corresponds to the rotational degree of the main motor 10. The vertical movements of the front paper supplying roller 15*b* and the back paper supplying roller 16*b*, the pressing movement of the pressing roller 25 generating pressing force on the paper driving roller 24 and the pressing movement of the thermal head 8 for generating pressing force on the platen roller 9 correspond to the rotational position of the cam 18. The positions of the cam 18, the rollers, and so forth as shown in FIG. 2 is called "mode II" in the below description. In mode II, the front paper supplying rollers 15*a* and 15*b* separate from each other, the back paper supplying rollers 16*a* and 16*b* contact each other, and the thermal head 8 separates from the platen roller 9.

The paper supplying operation is described below.

Figure 10:
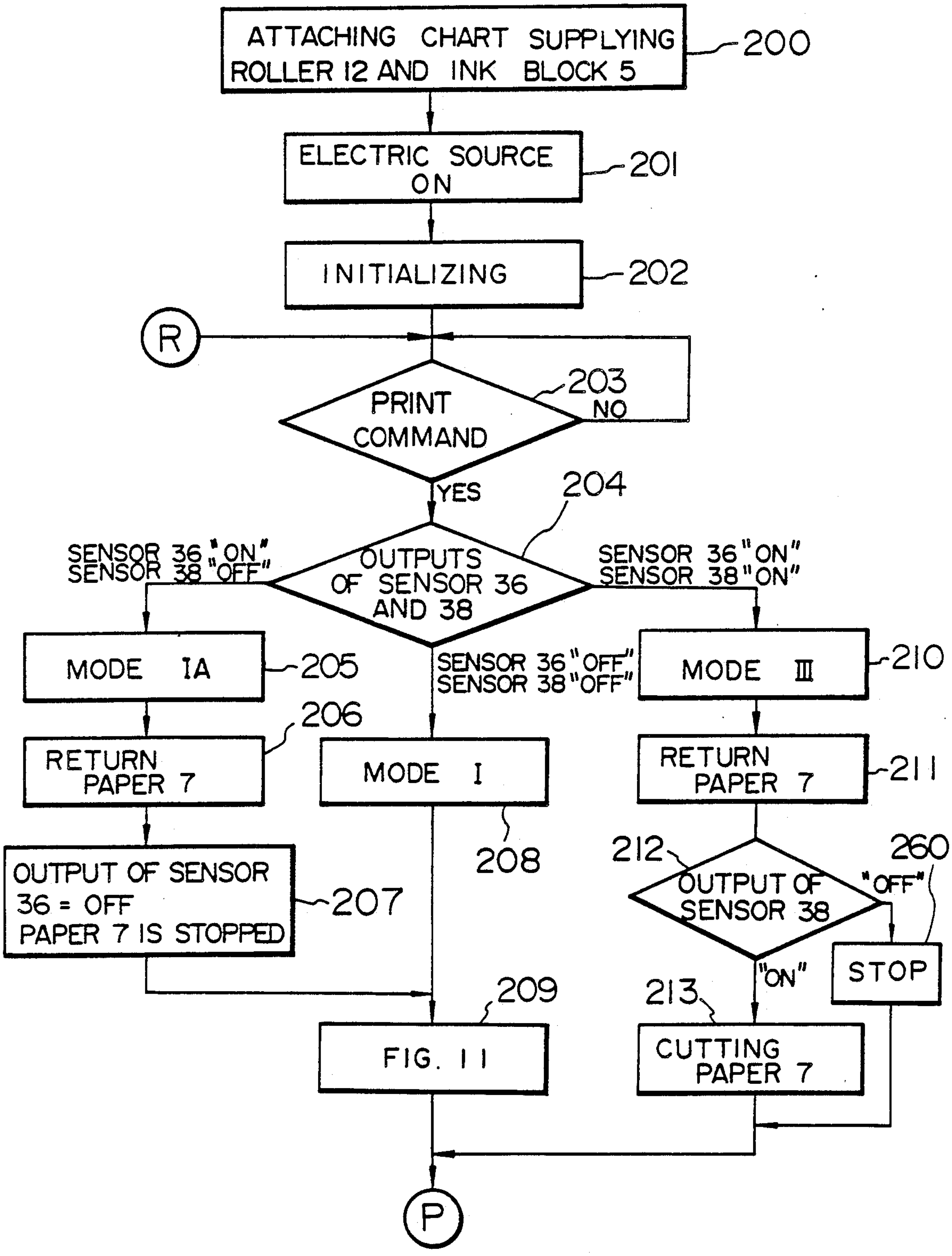
FIGS. 10, 11, 12 are diagrams showing flow charts for controlling the embodiment shown in FIG. 1.

When the head unit 3 is raised (for example, $\phi$=about 90 degrees in FIG. 3), the ink unit 5 and the paper supplying roller 12 are mounted in the device (step 200 in FIG. 10). The end of the paper 7*a* is passed between the front paper supplying rollers 15*a* and 15*b*. Since the back paper supplying rollers 16*a* and 16*b* contact each other, the paper 7 can not pass between them. Subsequently, the head unit 3 is moved downward, and pin 45 is inserted into groove 20 of cam 18. When the electric source is switched on (step 201), the device is initialized (step 202) and is in mode II. In the initializing operation, the rotational cutter 39 of the cutter unit 4 is driven by the cutter motor 78 to swing and is stopped at the predetermined position where the sensor 38 detects the cutter 39, so that the paper 7 can pass between the rotational cutter 39 and the fixed cutter 40. Further in the initializing operation, the temperature of the thermal head 8 is adjusted to the predetermined temperature range. When the temperature of the thermal head 8 is below the predetermined temperature range, electric current is applied to the resistance heating element 8*a*. When the temperature of the thermal head 8 is above the predetermined temperature range, the cooling fan 11 is driven to cool the thermal head 8.

Figure 11:
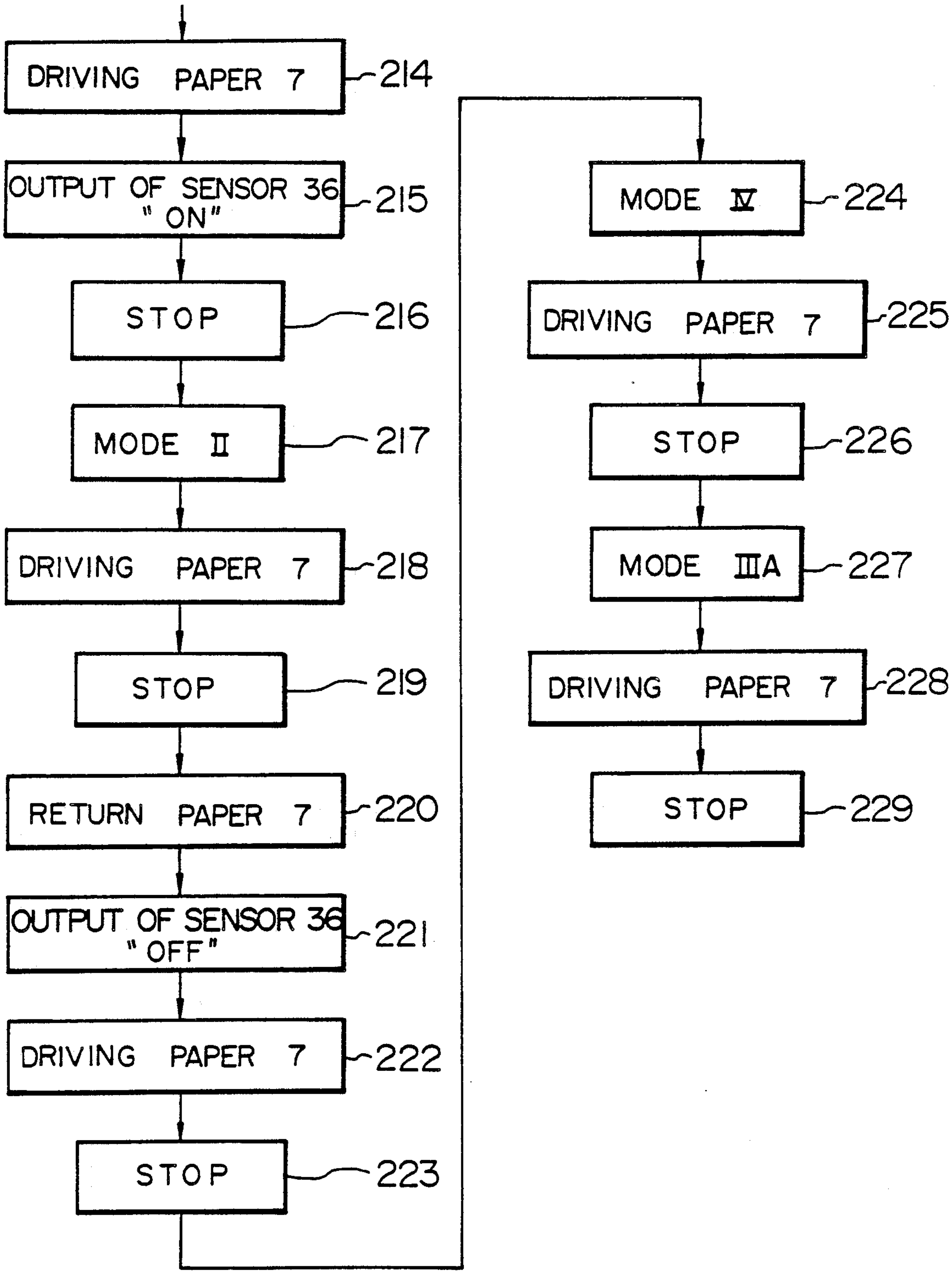

When the printer is in step 203 of FIG. 10 and a printing command is inputted, the printer proceeds to step 204. In step 204, the printer determines whether the end 7*a* of the paper 7 reaches the sensor 36 or not, whether the end 7*a* of the paper 7 reaches the sensor 37 or not, and whether the end 7*a* of the paper 7 reaches the sensor 38 or not. The outputs of the sensors 36, 37 and 38 show the position of the paper 7. If the paper end 7*a* has not reached the sensor 36, the printer proceeds to step 208. In step 208, the mode motor 83 drives the cam 18 which moves the paper supplying frame 14 with the paper supplying lever 13 to the right side of FIG. 3, so that the front paper supplying roller 15*b* is moved downward and the back paper supplying roller 16*b* is moved upward. This stage is "mode I". The paper 7 is nipped by the front paper supplying rollers 15*a* and 15*b*. The back paper supplying rollers 16*a* and 16*b* separate from each other. In this condition, the paper 7 is supplied to the paper driving unit 2. FIG. 11 shows the sequence of the paper supplying operation. The sequence shown in FIG. 11 is step 209.

In step 204, if the paper end 7*a* is between the sensor 36 and the sensor 38, the printer proceeds to step 205. In step 205, the mode motor 83 is actuated to obtain the "mode IA" stage. In this stage, the main motor 10 moves the paper 7 to the upstream side (step 206). When the output of the sensor 36 changes from "on" to "off", the paper 7 is stopped (step 207). Subsequently, the printer proceeds to step 209 as described above.

In step 204, if the paper end 7*a* reaches the sensor 38, the printer proceeds to step 210. In step 210, the mode motor 83 drives the cam 18 to move the paper supplying frame 14 via the paper supplying lever 13 so that the front paper supplying rollers 15*a* and 15*b* separate from each other and the back paper supplying rollers 16*a* and 16*b* separate from each other. The rotation of cam 18 also moves the paper driving pressing roller 25, via the paper driving pressing level 35 so that the paper driving pressing roller 25 is pressed against the paper driving roller 24. This stage is "mode III". The paper 7 nipped between the paper driving pressing roller 25 and the paper driving roller 24 is driven by the main motor 10 by the required distance toward the paper supplying roller (step 211). When the sensor 38 does not detect the paper 7, the paper 7 is stopped (step 260). If the sensor 38 detects the paper 7 for a period in excess of a predetermined time (step 261), the rotational cutter 39 is driven by the cutter motor 78 for one revolution to cut the paper 7 (step 213). When step 209 or step 213 is finished, the paper supplying operation is finished and the printer proceeds to the printing operation shown in FIG. 12.

In step 204 shown in FIG. 10, if the printer proceeds to step 208 or step 205 (mode IA or I), the printer operates as shown in FIG. 11. This operation is described below. The front paper supplying roller 15*a* is driven by the main motor 19 to move the paper 7 toward the platen roller 9 from the paper supplying roller 12 (step 214). When the output of the sensor 36 changes from "off" to "on", the paper 7 is stopped (step 216). The mode motor 83 is driven for "mode II". In this stage, the paper 7 is nipped between the back paper driving rollers 16*a* and 16*b* (step 217). The back paper supplying roller 16*a* is driven by the main motor 10 to move the paper 7 toward the platen roller 9 (step 218). When the travel of the paper 7 reaches the required point, the main motor 10 is stopped (step 219). Subsequently, the main motor 10 is rotated in the reverse direction to move the paper 7 toward the paper supplying roller 12 (step 220). In step 220, the paper supplying roller 12 is driven in the reverse direction to wind the paper 7 on the circumferential surface of the paper supplying roller 12, so that suitable tension is applied to the paper 7. If the output of the sensor 36 changes from "on" to "off", the rotational direction of the main motor 10 is reversed to move the paper 7 toward the platen roller 9 (step 222). When the travel of the paper 7 reaches the required point, the main motor 10 is stopped (step 223). At this stage, the paper end 7*a* is positioned between the thermal head 8 and the platen roller 9. In step 224, the cam 18 is driven by the mode motor 83 to drive the paper driving pressing roller 25 and the back paper supplying pressing roller 16*b* so that the paper 7 is nipped between the paper driving roller 24 and the paper driving pressing roller 25, and the paper 7 is not nipped between the back paper supplying rollers 16*a* and 16*b*. Subsequently, the thermal head 8 is moved downward to press the platen roller 9. This stage is "mode IV". The pressing force of the thermal head 8 is preferably 30 to 40 N/m. Subsequently, the main motor 10 drives the paper 7 toward the paper tension roller 27 (step 225). If the paper end 7*a* passes between the paper tension roller 27 and the paper tension pressing roller 28, the main motor 10 is stopped (step 226). In step 227, the mode motor 83 is driven for mode IIIA. In step 228, the main motor 10 drives the paper driving roller 24 to move the paper 7 toward the paper tension roller 27. When the travel of the paper 7 reaches the required point, the main motor 10 is stopped (step 229).

Figure 12:
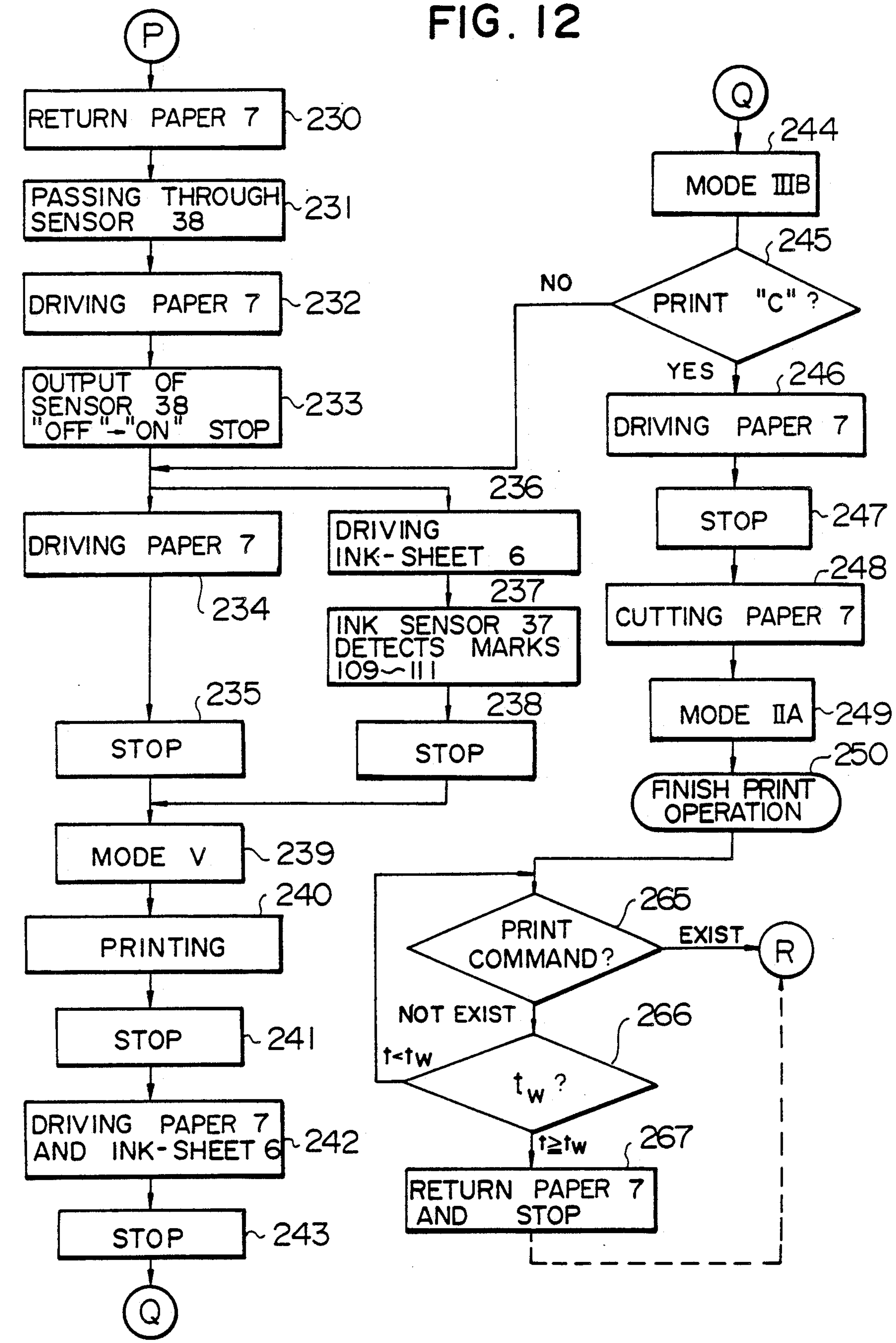

If the paper supplying operation is finished, the printer proceeds to the printing operation. FIG. 12 shows the printing operation. The main motor 10 drives the paper driving roller 24 to move the paper 7 toward the paper supplying roller (step 230). In step 231, if the sensor 38 does not detect the paper 7, the printer proceeds to step 232. In step 232, the main motor 10 drives the paper driving roller 24 to move the paper 7 toward the paper tension roller 27. In step 233, when the output of the sensor 38 changes from "off" to "on", the paper 7 is stopped. In this stage, the reference point for travel of the paper 7 is determined.

In step 234, the main motor 10 drives the paper driving roller 24 to move the paper 7 by the predetermined amount. (For example, when the paper is A4 size, the predetermined amount is the difference between the 297 mm of A4 length and the distance between the platen roller 9 and the paper end 7*a*). When the paper driving roller 24 finishes moving the paper 7 by the predetermined amount toward the paper tension roller 27, the main motor 10 is stopped (step 235). At the same time as the paper driving operation, the ink-sheet 6 is positioned (steps 236 to 238). The winding motor 82 drives the ink-sheet winding roller 54 to wind the ink-sheet 6 thereon (step 236). If the ink sensor 37 detects the ink mark 110 (step 237), the ink-sheet 6 is stopped (step 238). In step 239, the mode motor 83 drives the cam 18 so that the printer proceeds to mode V. A difference between mode V and mode IIIA is that in mode V the thermal head 8 is moved downward and presses the platen roller 9. The pressing force applied to the paper 7 between the thermal head 8 and the platen roller 9 is 160 to 200 N/m.

In step 240, the main motor 10 drives the paper driving roller 24 to move the paper 7 to the required position toward the paper driving roller 24. When the required position on the paper 7 passes between the thermal head 8 and the platen roller 9, the heating resistance element 8*a* of the thermal head 8 is heated by electric current supplied in accordance with the print pattern and the print color so that the first color ink (Y in FIG. 7) on the ink-sheet is evaporated. The evaporated ink diffuses into the surface of the paper 7 and is solidified therein. Therefore, the ink is transferred to the paper 7. Since the clutch-brake unit 74 brakes the rotation of the paper tension roller 27, suitable tension is applied to the paper 7, so that the travel of the paper 7 corresponds with the rotational degrees of the paper driving roller 24. The paper supplying roller 12 winds the paper 7 so that the paper 7 moved by the paper driving roller 24 is not slack.

In step 240, suitable torques Ts and Tt are applied to the ink-sheet supplying roller 53 and the ink-sheet winding roller 54, respectively, so that suitable tension is applied to the ink-sheet 6. Since Tt is larger than Ts, the ink-sheet 6 is moved toward the ink-sheet winding roller 54. Since the frictional force between the paper 7 and the ink-sheet 6 is larger than the frictional force between the thermal head 8 and the ink-sheet 6 when the ink-sheet 6 and the paper 7 are pressed by the thermal head 8 on the platen roller 9, the ink-sheet 6 slips on the thermal head 8. Therefore, the travel of the ink-sheet 6 is identical with that of the paper 7. According to the travel of the ink-sheet 6, the ink-sheet supplying roller 53 supplies the ink-sheet 6 and the ink-sheet winding roller 54 winds the ink-sheet 6 thereon. The suitable tension applied to the ink-sheet 6 prevents the ink-sheet 6 from slackening and crumpling.

The ink-sheet 6 and the paper 7 adhered to each other by the transferred ink for printing are moved from the platen roller 9 to the front separating roller 55 and are separated by the respective tensions from each other on the front separating roller 55 (forward separating).

Since the platen roller 9 is not driven by the main motor 10 when the main motor 10 rotates in the direction for moving the paper 7 from the platen roller 9 toward the paper driving roller 24, during that time slight tension is applied to the paper 7 by the friction of the platen roller 9, so that the paper 7 can be positioned even when the paper end 7*a* exists between the platen roller 9 and the paper tension roller 27. If more tension on the paper 7 is required when the paper tension roller 27 is not applying tension to the paper 7, the platen roller braking means may be added to the platen roller 9. Therefore, the thermal head 8 can print the paper end 7*a*, so that so-called "whole surface printing" is obtained. When the paper end 7*a* reaches the platen roller 9, the paper is stopped (step 241).

In step 242, the printed paper end 7*a* and the ink-sheet 6, which are adhered to each other by the transferred ink for printing, are separated from each other. Since the platen roller 9 is driven by the main motor 10 when the paper 7 is moved toward the paper tension roller 27, and the platen roller 9 applies suitable driving force to the paper 7, the printed paper end 7*a* and the ink-sheet 6 can be moved without slackening to the back separating roller 56 where they are separated from each other (backward separating). The separating force is changed by adjusting the torque delivered by the torque limiter 84. When the paper 7 has returned to the reference point described above, the paper 7 is stopped (step 243). The printing operation for first color (Y in FIG. 7) is finished at this time.

The printing operation for second color (M in FIG. 7) is described below.

The mode motor 83 drives the cam to release the pressing force of the thermal head 8, so that the device proceeds to mode IIIB (step 244). In step 245, the printer determines whether the third color (C in FIG. 7) is printed or not. At this stage, since the printer is in the second color recording operation, the printer proceeds to step 234. In steps 234 to 243, the second color printing operation is similar to the first color printing operation. The current supplied to the thermal head 8 is adjusted in accordance with the colors of the transferred inks.

Figure 13:
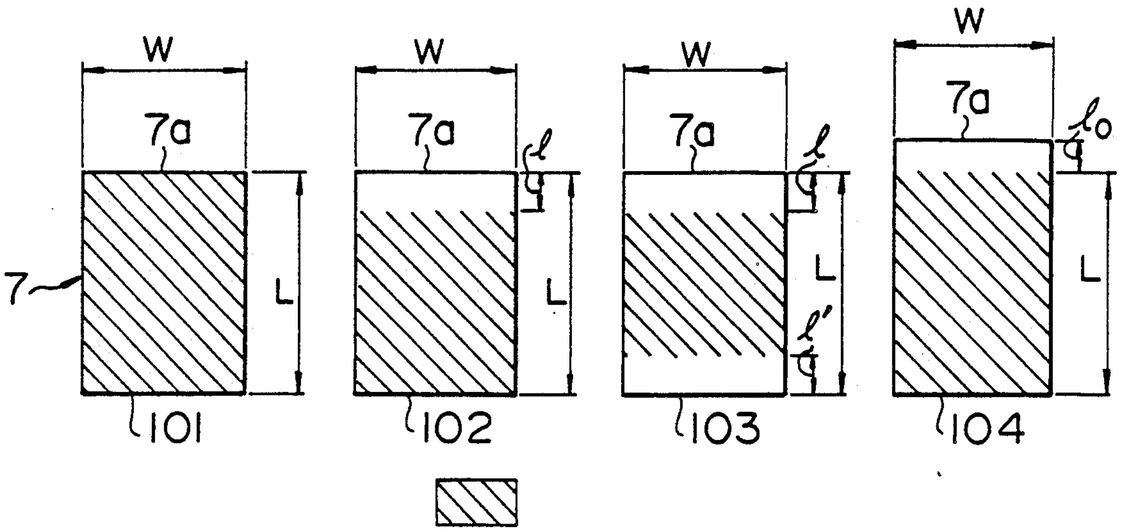
FIG. 13 is a plan view showing a paper being printed by an embodiment of the present invention.

The third color printing operation is described below. In step 245, the device determines whether the third color is printed or not. At this stage, since the printer is in the third color printing operation, the printer proceeds to step 246. In steps 246 and 247, the main motor 10 drives the paper driving roller 24 to move the paper 7 toward the paper tension roller 27 by the predetermined amount which corresponds to the distance between the platen roller 9 and the cutting position of the cutter unit 4. When the moved length reaches the predetermined amount, the paper 7 is stopped. In step 248, the cutter motor 78 drives the cutter to cut the paper 7. In the above printing operations, the color print 101 in FIG. 13 printed all over the surface thereof is obtained. Subsequently, the device proceeds to mode IIA (step 249), so that the printing operation is finished (step 250).

The printer remains in stand-by condition until the next printing command is inputted. When the printing command is inputted, the printer proceeds to R shown in FIG. 10, so that the printer starts the printing operation. In step 265, the printer determines whether the printing command is inputted or not, and if the printing command is not inputted, the period of time for which the printer has remained in stand-by condition is compared with a predetermined period tw (step 266). If the stand-by period t is less than tw, the printer proceeds to step 265 and repeats steps 265 and 266. If the stand-by period t is not less than tw, the main motor 10 drives the back paper supplying roller 16a to move the paper 7 toward the paper supplying roller 12. When the output of sensor 36 changes from "on" to "off", the paper 7 is stopped (step 267). The printer remains in stand-by condition until the next printing command is inputted. Since the paper 7 deforms plastically when the paper 7 is arranged along the circumferential surface of the platen roller 9 for a long period, the above operation is required in the stand-by condition of the printer.

The ink-sheet 6 and the paper 7 adhered to each other by the transferred ink for printing can be separated from each other in another method which does not require backward separation, but uses only forward separation.

Figure 15:
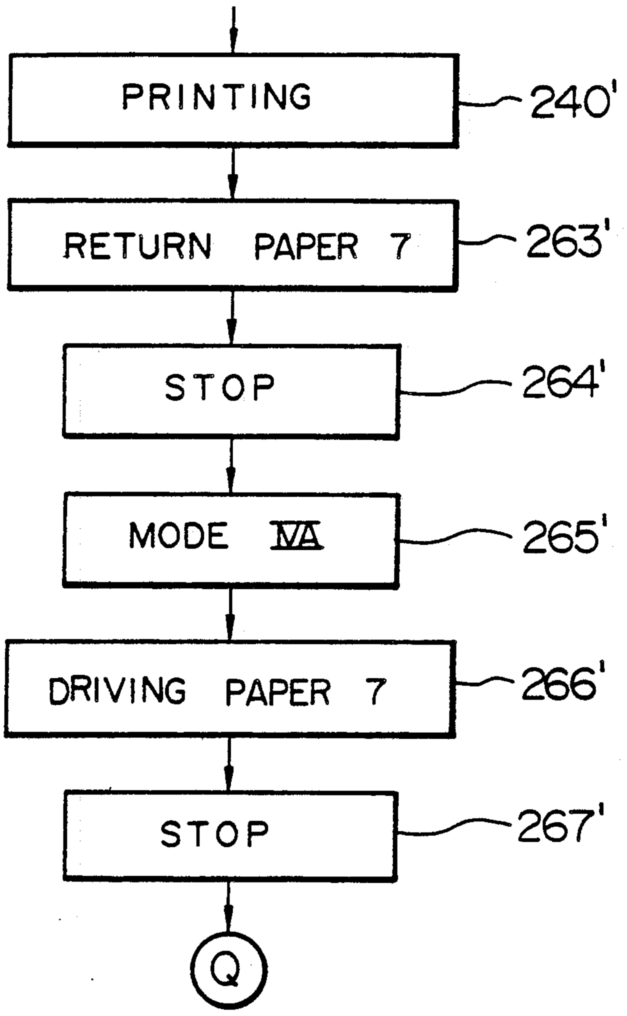
FIG. 15 is a flow chart for controlling another embodiment of the present invention.
Figure 16:
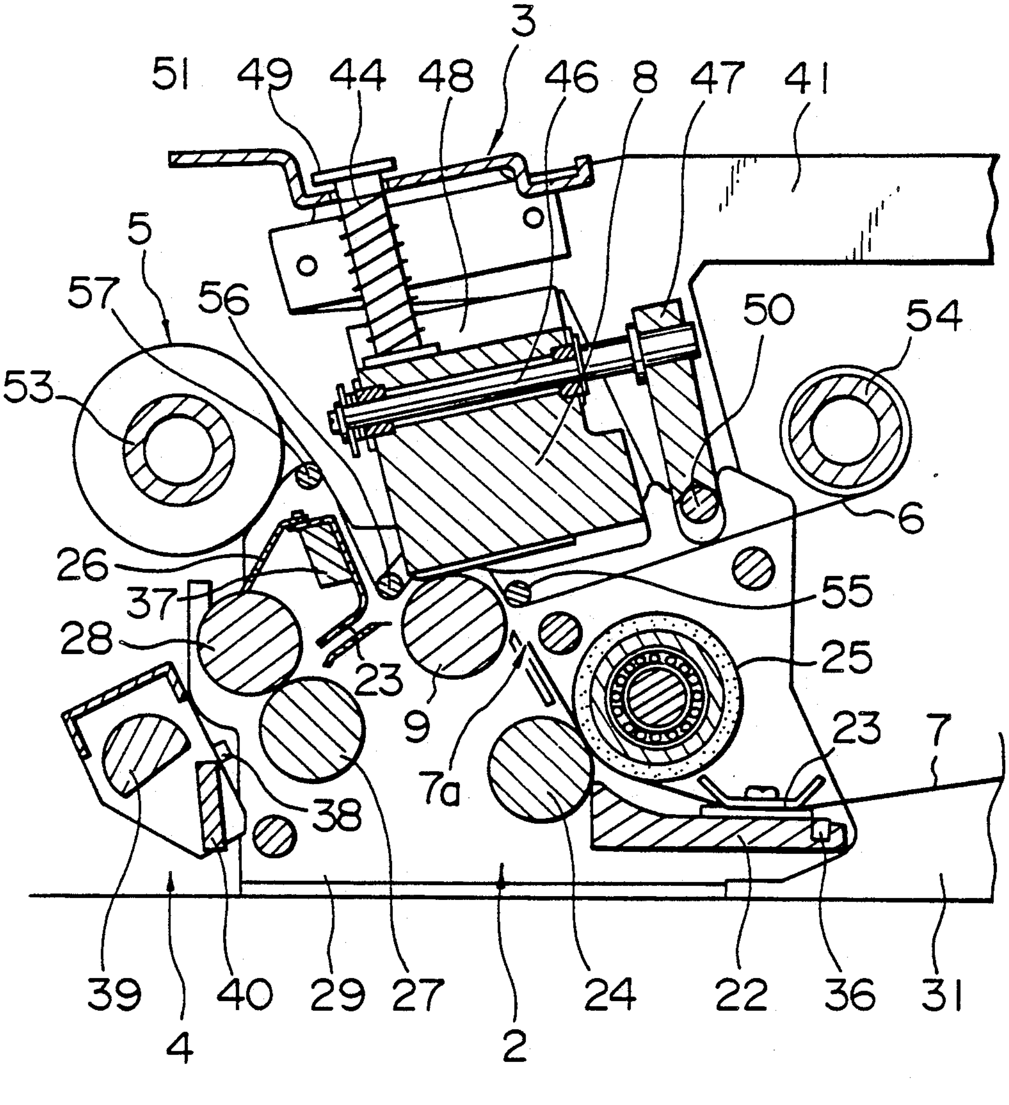
FIG. 16 is a partially cross-sectional view showing another embodiment the present invention.

In this method, steps 240 to 243 shown above are replaced by steps 240', 263', 264', 265', 266' and 267' shown in FIG. 15. The paper 7 to which the first color ink is transferred is moved toward the paper driving roller 24 (step 240'), and further is moved between the platen roller 9 and the paper driving roller 24 (step 263'). When the paper 7 has reached a position between the front separating roller 55 and the paper driving roller 24, the ink-sheet 6 and the paper 7 are separated from each other, and the paper 7 is stopped as shown in FIG. 16 (step 264'). The mode motor 83 drives the cam 18 so that the printer proceeds to mode IVA (step 265'). In step 266', the main motor 10 drives the paper driving roller 24 and the platen roller 9 to move the paper 7 toward the platen roller 9. When the paper end 7a has reached a position between the paper tension roller 27 and the paper tension pressing roller 26, the paper 7 is stopped (step 267'). In this method, the difficult backward separation is not required, so that the reliability of separating is increased.

Figure 14:
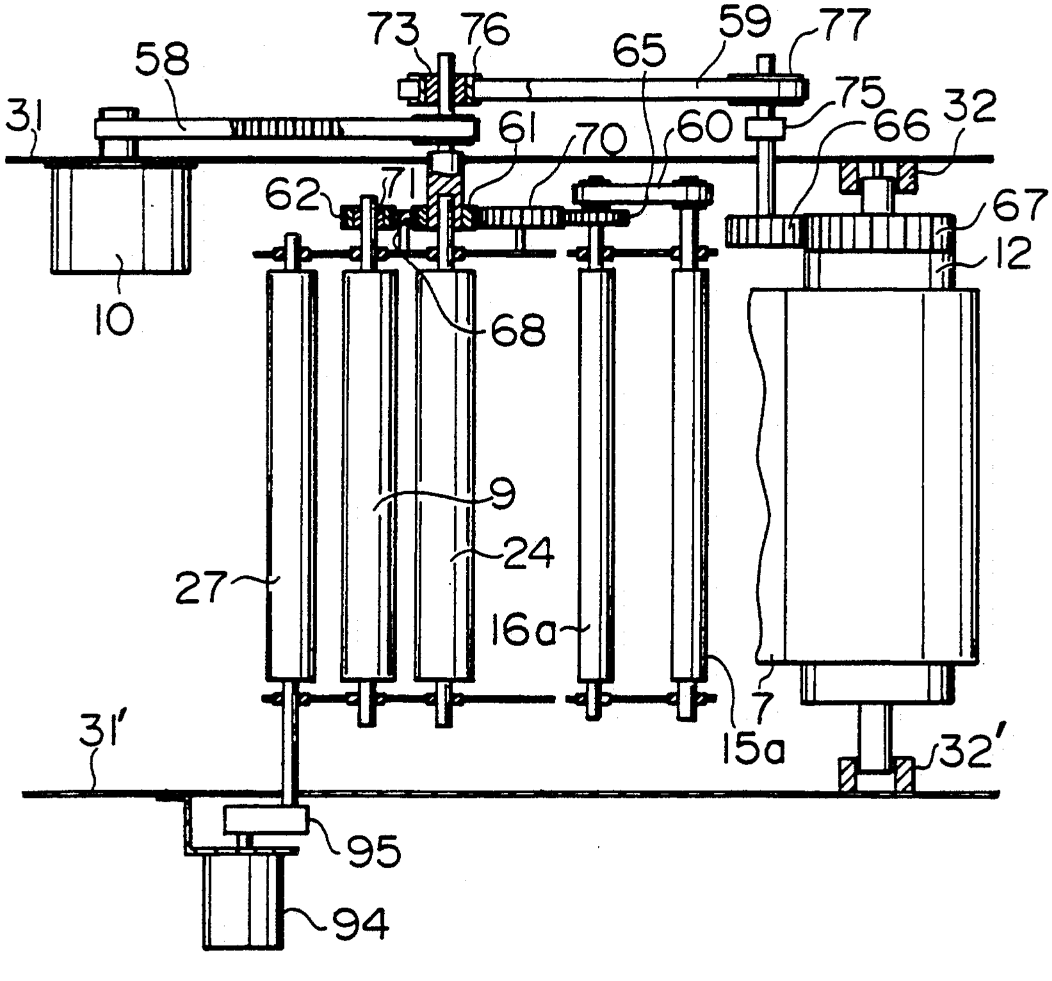
FIG. 14 is a plan view showing a driving mechanism of another embodiment of the present invention.

FIG. 14 shows another embodiment of the present invention in which the paper tension roller 27 is not connected to the main motor 10 but is driven by a paper tension motor 94 through speed reduction means 95. The platen roller 9 and so forth are connected to the main motor 10 through the transmission mechanism, as shown in FIG. 8. The paper tension motor 94 generates rotational torque to apply tension to the paper 7 so that the length of the paper 7 moved by the paper driving roller 24 correctly corresponds to the length of the paper 7 moved on the platen roller 9. The paper tension motor 94 is, for example, a DC servo motor so that the tension of the paper 7 can be controlled more precisely and the transmission mechanism is more simplified in comparison with the above embodiment using the clutch-brake unit.

Figure 17:
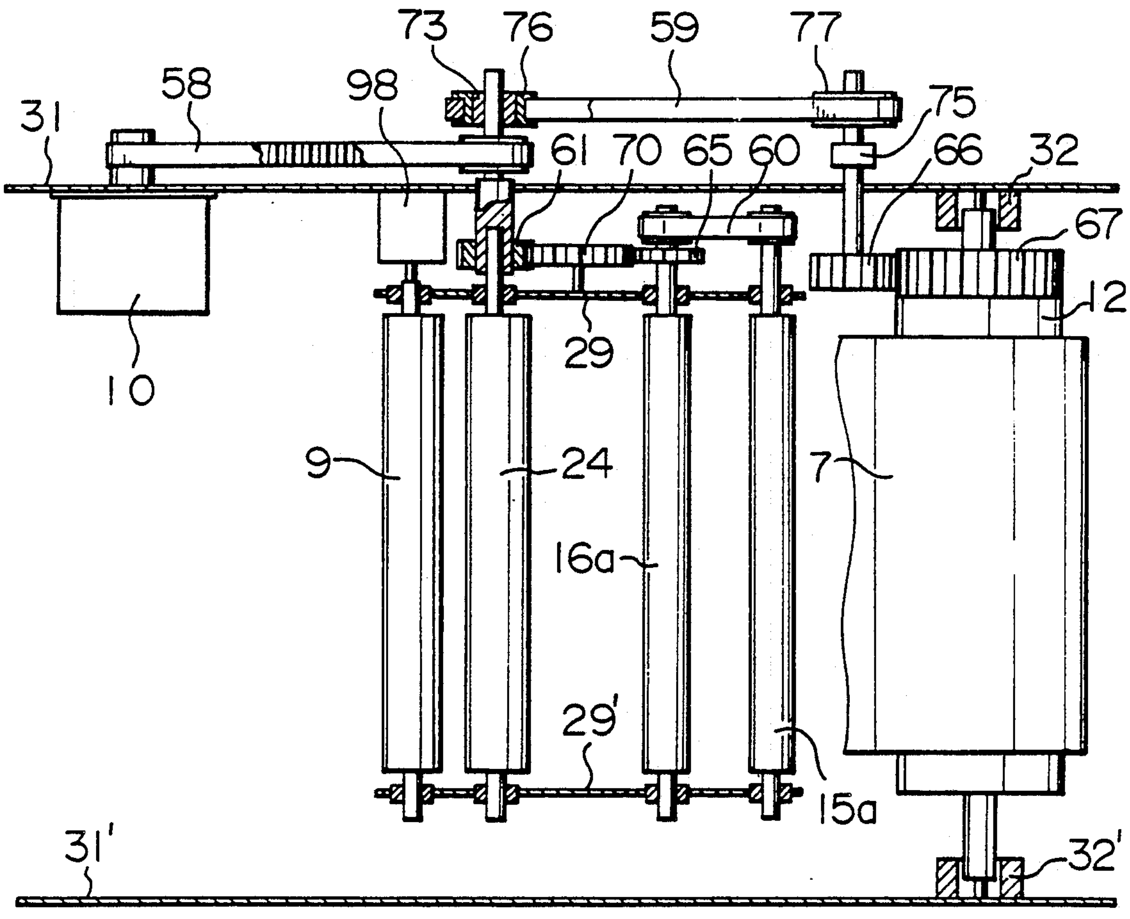
FIG. 17 is a plan view showing a driving mechanism of another embodiment of the present invention.

FIG. 17 shows another embodiment of the present invention in which the paper tension roller driven by the main motor 10 is not utilized and the platen roller 9 is not connected to the main motor 10 but is driven by a platen roller driving motor 98. The platen roller driving motor 98 generates rotational torque to apply tension to the paper 7 so that the length of the paper 7 moved by the paper driving roller 24 correctly corresponds to the length of the paper 7 moved on the platen roller 9. The platen roller driving motor 98 is, for example, a DC servo motor so that the tension on the paper 7 can be controlled more precisely and the transmission mechanism is more simple in comparison with the above embodiment using the clutch-brake unit. Since the platen roller 9 can apply suitable tension to the paper 7 and this embodiment does not require the paper tension roller, this embodiment is suitable for "whole surface printing".

Figure 18:
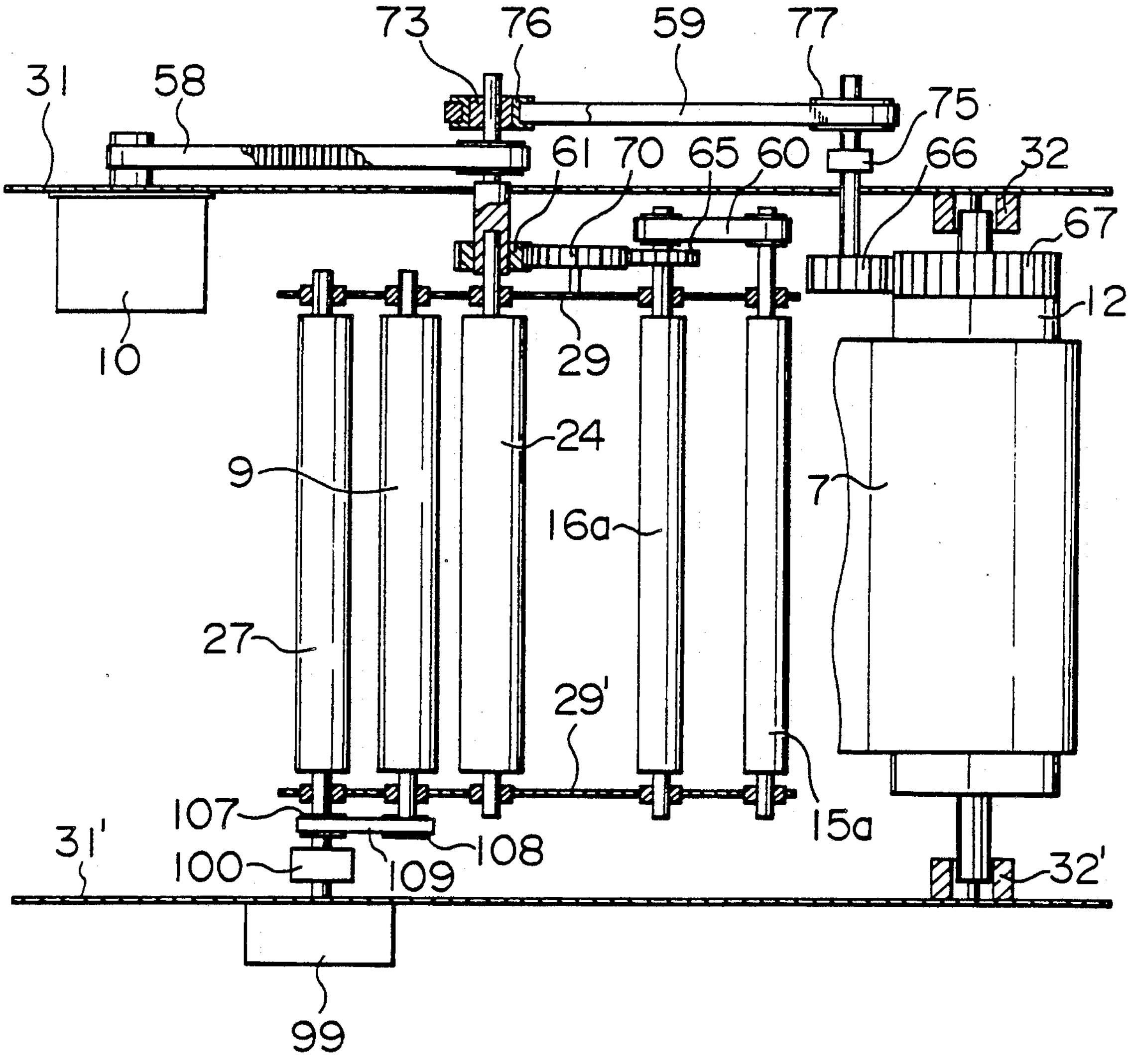
FIG. 18 is a plan view showing a driving mechanism of still another embodiment of the present invention.

FIG. 18 shows another embodiment of the present invention in which the paper tension roller 27 is not connected to the main motor but is driven by a paper tension motor 99 through clutch means 100, and the platen roller 9 is driven by the paper tension motor 99 through the paper tension roller 27. The paper tension motor 99 generates rotational torque to apply tension to the paper 7 so that the length of the paper 7 moved by the paper driving roller 24 correctly corresponds to the length of the paper 7 moved on the platen roller 9. The paper tension motor 99 is, for example, a DC servo motor so that the tension on the paper 7 can be controlled more precisely. Since the platen roller 9 can apply suitable tension to the paper 7, this embodiment is suitable for "whole surface printing". Since the clutch means 100 can release the engagement between the paper tension motor 99 and the paper tension roller 27 when the paper is in trouble, the paper tension roller 27 and the platen roller 9 are rotatable so that the paper 7 in trouble can be drawn out from the printer.

What is claimed is:

1. A therman transfer printer comprising:

a thermal head, including means for generating heat in accordance with a desired print pattern;

platen means having a surface for supporting an ink-sheet and paper to permit the ink-sheet and paper to be pressed by the thermal head on the platen means surface so that ink from the ink-sheet is transferred to the paper;

paper supplying means for storing and supplying paper;

ink-sheet supplying and driving means for storing and supplying an ink-sheet, the ink-sheet supplying and driving means including means for driving the ink-sheet to cause the ink-sheet to move in accordance with movement of the paper;

paper driving means arranged between the platen means and the paper supplying means, the paper driving means including means for driving the paper by a required length according to the position of the paper relative to the position of the platen means;

paper tension means for applying suitable tension to the paper at least between the platen means and the paper driving means so that the length by which the paper driving means drives the paper is identical with the length by which the paper moves on the platen means.

2. A thermal transfer printer comprising;

a thermal head, including means for generating heat in accordance with a desired print pattern;

platen means having a surface for supporting an ink-sheet and paper to permit the ink-sheet and paper to be pressed by the thermal head on the platen means surface so that ink from the ink-sheet is transferred to the paper;

paper supplying means for storing and supplying paper;

ink-sheet supplying and driving means for storing and supplying an ink-sheet, the ink-sheet supplying and driving means including means for driving the ink-sheet to cause the ink-sheet to move in accordance with movement of the paper; and paper driving means arranged between the platen means and the paper supplying means, the paper driving means including means for driving the paper by a required length according to the position of the paper relative to the position of the platen means;

the platen means including means for applying suitable tension to the paper between the platen means and the paper driving means so that the length by which the paper driving means drives the paper is identical with the length by which the paper moves on the platen means.

3. A thermal transfer printer comprising:

a thermal head, including means for generating heat in accordance with a desired print pattern;

platen means having a surface for supporting an ink-sheet and paper to permit the ink-sheet and paper to be pressed by the thermal head on the platen means surface so that ink from the ink-sheet is transferred to the paper;

paper supplying means for storing and supplying paper;

ink-sheet supplying and driving means for storing and supplying an ink-sheet, the ink-sheet supplying and driving means including means for driving the ink-sheet to cause the ink-sheet to move in accordance with movement of the paper;

paper driving means arranged between the platen means and the paper supplying means, the paper driving means including means for driving the paper by a required length according to the position of the paper relative to the position of the platen means; and paper tension means arranged on the opposite side of the platen means from the paper driving means, the paper tension means applying suitable tension to the paper between the paper tension means and the paper driving means so that the length by which the paper driving means drives the paper is identical with the length by which the paper moves on the platen means.

4. A thermal transfer printer according to claim 2, further comprising paper tension means arranged on the opposite side of the platen means for the paper driving means, the paper tension means applying tension to the paper between the paper tension means and the paper driving means.

5. A thermal transfer printer according to claim 3, wherein the paper driving means includes a paper driving roller having a high-hardness-grain-coated circumferential driving surface, the papering being driven through the high-hardness-grain-coated circumferential driving surface, and wherein the paper tension means includes a paper tension roller having a high-hardness-grain-coated circumferential tension surface, the paper being driven through the high-hardness-grain-coated circumferential tension surface.

6. A thermal transfer printer according to claim 1, further comprising helper driving means arranged between the paper driving means and the paper supplying means, the helper driving means moving and guiding the paper between the paper supplying means and the paper driving means.

7. A thermal transfer printer according to claim 6, wherein the helper driving means includes a pair of helper driving rollers, the paper being gripped and moved between the circumferential surfaces of the pair of helper driving rollers.

8. A thermal transfer printer according to claim 1, further comprising standby time measuring means for measuring a standby period of time during which the paper driving means does not move the paper, the stand-by time measuring means generating control signals for the paper driving means and the paper supplying means to cause the paper to be driven away from the platen means so that the paper is stored in the paper supplying means when the standby period is longer than a predetermined duration.

9. A thermal transfer printer according to claim 1, wherein the paper supplying means includes means for applying tension to the paper between the paper supplying means and the paper driving means.

10. A thermal transfer printer according to claim 1, wherein the thermal head includes means responsive to movement of the paper from the platen means toward the paper driving means for activating the head generating means to generate heat and responsive to movement of the paper from the chart driving means toward the platen means for deactivating the heat generating means.

11. A thermal transfer printer according to claim 10, wherein the chart driving means includes means for reciprocating the paper to permit repetitive printing on a selected position on the paper.

12. A thermal transfer printer according to claim 10, wherein the platen means comprises a roller and means for driving the roller to drive the paper when the paper is moved from the paper driving means toward the platen means, the roller being free to be rotated by the paper when the paper is moved from the platen means toward the paper driving means.

13. A thermal transfer printer according to claim 3, wherein the paper tension means includes slip drive means for driving the paper tension means to drive the paper.

14. A thermal transfer printer according to claim 13, wherein each of the platen means and the paper tension means comprises a roller and means for driving the roller to drive the paper when the paper is moved from the paper driving means toward the platen means, each roller being free to be rotated by the paper when the paper is moved from the platen means toward the paper driving means.

* * * * *